(12) United States Patent
Lai et al.

(10) Patent No.: US 9,859,784 B2
(45) Date of Patent: Jan. 2, 2018

(54) HYBRID POWER CONVERTOR AND CONTROL METHOD THEREOF

(71) Applicants: LITE-ON ELECTRONICS (GUANGZHOU) CO., LTD., Guangzhou (CN); LITE-ON TECHNOLOGY CORPORATION, Taipei (TW)

(72) Inventors: Wei Lieh Lai, New Taipei (TW); Yi Pin Lee, New Taipei (TW)

(73) Assignees: LITE-ON TECHNOLOGY CORPORATION, Taipei (TW); LITE-ON ELECTRONICS (GUANGZHOU) CO., LTD., Guangzhou (CN)

( * ) Notice: Subject to any disclaimer, the term of this patent is extended or adjusted under 35 U.S.C. 154(b) by 49 days.

(21) Appl. No.: 15/060,215

(22) Filed: Mar. 3, 2016

(65) Prior Publication Data
US 2017/0093271 A1 Mar. 30, 2017

(30) Foreign Application Priority Data
Sep. 30, 2015 (TW) .............................. 104132034 A (51) Int. Cl.
  *H02M 3/158* (2006.01)
  *H02M 1/088* (2006.01)
  *H02M 1/00* (2006.01)

(52) U.S. Cl.
  CPC ......... *H02M 1/088* (2013.01); *H02M 3/1582* (2013.01); *H02M 2001/0045* (2013.01)

(58) Field of Classification Search
  CPC ........ H02M 1/08; H02M 1/088; H02M 3/156; H02M 1/158; H02M 1/1582; H02M 2001/0045; H02M 2003/158
  See application file for complete search history.

(56) References Cited

U.S. PATENT DOCUMENTS 7,518,346 B2 * 4/2009 Prexl ................... H02M 3/1582
                                              323/222
7,560,911 B2 * 7/2009 Nishida ............... H02M 3/1582
                                              323/259

(Continued)

FOREIGN PATENT DOCUMENTS

CN        102820775 A    12/2012

*Primary Examiner* — Matthew Nguyen
(74) *Attorney, Agent, or Firm* — K&L Gates LLP (57) ABSTRACT

A hybrid power convertor includes an input to receive an input voltage, an output to export an output voltage, a control module, a switching module, a buck module and a boost module. The control module has a first comparison terminal coupled to the input, a second comparison terminal coupled to the output, a mode-control terminal, a boost-control terminal and a buck-control terminal. The switching module is coupled to the input and the mode-control terminal, and has a buck input terminal and a boost input terminal. The buck module is coupled to the buck input terminal, the buck-control terminal and the output terminal, and the buck module is able to perform a switching convertor mode and a linear regulator mode. The boost module is coupled to the boost input terminal, the boost-control terminal and output terminal, and the boost module is able to perform a boost convertor mode and a linear-like regulator mode.

23 Claims, 4 Drawing Sheets

(56) References Cited

U.S. PATENT DOCUMENTS

| | | | | |
|---|---|---|---|---|
| 8,638,082 B2* | 1/2014 | Miyamae | ............ | H02M 3/1582 |
| | | | | 323/284 |
| 2013/0320949 A1* | 12/2013 | Prexl | .................... | H02M 3/158 |
| | | | | 323/290 |
| 2014/0015507 A1* | 1/2014 | Park | .................... | H04B 1/1607 |
| | | | | 323/304 |
| 2015/0162835 A1* | 6/2015 | Hang | .................. | H02M 3/1582 |
| | | | | 323/271 |

* cited by examiner

HYBRID POWER CONVERTOR AND CONTROL METHOD THEREOF

RELATED APPLICATIONS

This application claims the benefit of Taiwan Patent Application No. 104132034, filed on Sep. 30, 2015, at the Taiwan Intellectual Property Office, the entire disclosure of which is incorporated herein by reference.

FIELD OF THE INVENTION

The invention relates to a power convertor, more particularly to a hybrid power convertor and a control method thereof.

BACKGROUND OF THE INVENTION

At present, a DC buck technique is mainly implemented with a linear regulator or a buck switching converter. The linear regulator adopts one power transistor (such as a bipolar junction transistor or a field effect transistor) and the power transistor is operated in the linear mode and the power transistor is equivalent to a variable resistor coupled to an output load in series at the moment. It is obvious that the output current will flow through the power transistor. Therefore, when the difference between the input voltage and the output voltage of the power convertor increases in the linear regulator, the linear regulator will cause great power consumption.

The buck switching converter also has a power transistor, which can be operated as a switch and only operated in the saturation mode and the cutoff mode. As to the buck switching converter, the relation between the input voltage and the output voltage depends on the duly cycle of the power transistor. Therefore, when the input voltage and the output voltage of the power convertor in the buck switching converter are close to each other, the duty cycle of the power transistor must extremely approach one theoretically. However, the manufactory technique for electric elements at present is hard to promote the transistor with such high duty cycle.

Figure 1:
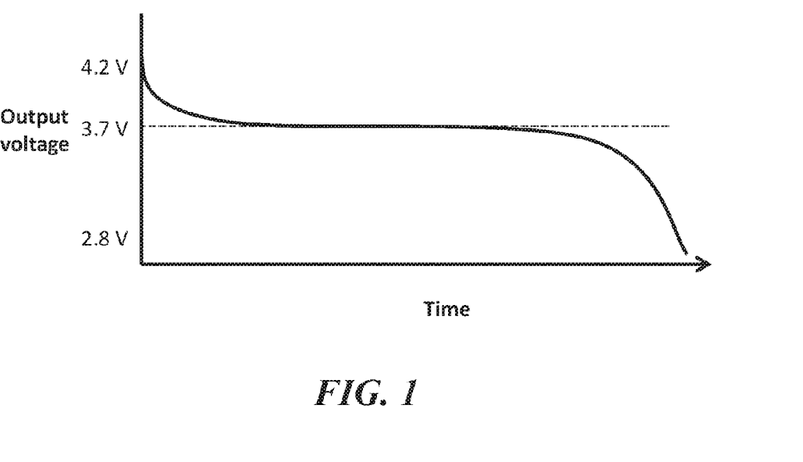
FIG. 1 shows the discharge curve of one single lithium-ion cell and demonstrates the discharge voltage varying with time from saturation, wherein the vertical axis stands for the output voltage of the single lithium-ion cell and the horizontal axis stands for the time already passed.

For an uninterrupted power supply or a portable power bank implemented with the DC buck technique, according to the different purposes, they may be designed to include a set of cells rather than one cell. Taking a lithium-ion battery with four lithium-ion cells in series for example, its float range of working voltage would be four times the float range of one lithium-ion cell. As shown in FIG. 1, the float range for one cell is 4.2V to 2.8V. Thus the float range for a lithium-ion battery would be 16.8V to 11.2V. Using more cells in series is able to adapt to the condition for higher output voltage, however that causes the increase in the float range of working voltage. It is a dilemma when designing a power convertor.

SUMMARY OF THE INVENTION

Therefore, an object of the present invention is to provide a hybrid power convertor and a control method thereof. The hybrid power convertor accommodates to the difference between the various input voltages and the output voltage and solve the problem of battery output voltage dropping to be lower than the working voltage of the loading.

In accordance with an aspect of the present invention, a hybrid power convertor is provided. The hybrid power convertor includes an input terminal receiving an input voltage; an output terminal exporting an output voltage; a control module having a first comparison terminal coupled to the input terminal, a second comparison terminal coupled to the output terminal, a mode-control terminal, a boost-control terminal and a buck-control terminal; a switching module coupled to the input terminal and the mode-control terminal, and having a buck input terminal and a boost input terminal; a buck module coupled to the buck input terminal, the buck-control terminal and the output terminal, and capable of performing a switching conversion mode and a linear regulation mode; and a boost module coupled to the boost input terminal, the boost-control terminal and the output terminal, and capable of performing a boost conversion mode and a linear-like regulation mode, wherein when the input voltage is greater than the output voltage, the control module makes the switching module conductive to the buck module; and when the input voltage is not greater than the output voltage, the control module makes the switching module conductive to the boost module.

Preferably, the buck module includes a buck transistor having a first buck transistor terminal, a second buck transistor terminal and a third buck transistor terminal, wherein the first buck transistor terminal is coupled to the buck input terminal; a buck inductor having a first buck inductor terminal and a second buck inductor terminal, wherein the first buck inductor terminal is coupled to the second buck transistor terminal, and the second buck inductor terminal is coupled to the output terminal; a buck capacitor having a first capacitor terminal and a second capacitor terminal, wherein the first capacitor terminal is coupled to the second buck inductor terminal, and second capacitor terminal is grounded; and a buck conductive element at least having a first buck conductive element terminal and a second buck conductive element terminal, wherein the first buck conductive element terminal is coupled to the second buck transistor terminal, and the second buck conductive element terminal is grounded, wherein the third buck transistor terminal is coupled to the buck-control terminal, and the control module makes the buck module alternatively perform in one of the switching conversion mode and the linear regulation mode based on a predetermined buck level.

Preferably, the boost module includes a boost inductor having a first boost inductor terminal and a second boost inductor terminal, wherein the first boost inductor terminal is coupled to the boost input terminal; a boost transistor having a first boost transistor terminal, a second boost transistor terminal and a third boost transistor terminal, wherein the first buck transistor terminal is coupled to the second boost inductor terminal and the second boost inductor is grounded; a boost diode at least having an anode and a cathode, wherein the anode is coupled to the second boost inductor terminal, and the cathode is coupled to the output terminal; and a boost capacitor having a first boost capacitor terminal and a second boost capacitor terminal, wherein the first boost capacitor terminal is coupled to the cathode and the second boost capacitor is grounded, wherein the third boost transistor terminal is coupled to the boost-control terminal, and the control module makes the boost module alternatively perform in one of the boost conversion mode and the linear-like regulation mode based on a predetermined boost level.

In accordance with another aspect of the present invention, a method of controlling a hybrid power convertor is provided. The method of controlling a hybrid power convertor includes providing a voltage to make the hybrid power convertor generate an output voltage; determining a rated voltage based on the output voltage; and performing an initial voltage determining step which comprises (1) when the voltage is greater than the output voltage, entering a buck mode; and (2) when the voltage is not greater than the output voltage, entering a boost mode.

During the buck mode, preferably the method includes performing a first buck determining step which comprises (1) when the voltage is greater than a first predetermined buck level, entering a switching conversion mode; and (2) when the voltage is not greater than the first predetermined buck level, entering a linear regulation mode, wherein the first predetermined buck level is 1/0.95 times the rated voltage.

Under the switching conversion mode, preferably the method includes returning to the first buck determining step after a first buck predetermined period.

Under the linear regulation mode, preferably the method includes performing a second buck determining step after a second buck predetermined period and the second buck determining step further includes when the voltage is greater than a second predetermined buck level, entering the switching conversion mode, wherein the second predetermined buck level is 1/0.9 times the rated voltage.

Preferably, the second buck determining step further includes when the voltage is not greater than the second predetermined buck level, performing a third buck determining which comprises (1) when the voltage is not less than a third predetermined buck level, returning to the linear regulation mode; and (2) when the voltage is less than the third predetermined buck level, shutting down the hybrid power convertor, wherein the third predetermined buck level is 0.896 times the rated voltage.

During the boost mode, preferably the method includes performing a first boost determining step which comprises (1) when the voltage is not less than a first predetermined boost level, entering a linear-like regulation mode; and (2) when the voltage is less than the first predetermined boost level, entering a boost conversion mode, wherein the first predetermined boost level is 0.96 times the rated voltage.

Under the linear-like regulation mode, preferably the method includes returning to the first boost determining step after a first boost predetermined period.

Under the boost conversion mode, preferably the method includes performing a second boost determining step after a second boost predetermined period and the second boost determining step further includes when the voltage is greater than a second predetermined boost level, entering the linear-like regulation mode, wherein the second predetermined boost level is the rated voltage.

Preferably, the second boost determining step further includes when the voltage is not greater than the second predetermined boost level, performing a third boost determining which comprises (1) when the voltage is not less than a third predetermined boost level, entering to the boost conversion mode; and (2) when the voltage is less than the third predetermined boost level, shutting down the hybrid power convertor, wherein the third predetermined boost level is 0.672 times the rated voltage.

Preferably, the first boost determining step further includes entering the linear-like regulation mode when the voltage equals to the output voltage.

In the present invention, the ways suppress and lift the input voltage are determined by the various predetermined level under the buck mode and the boost mode. There are two sub-modes under each mode to improve the efficiency of electricity conversion. The present invention enables the power source, such as various batteries, to improve the efficiency and release electrical power as much as possible on the premise that the power source will not be damaged due to over discharge. In the other hand, the device of present invention provides the buck mode and the boost mode based on the possible change of the loading to adapt practical applications.

In addition, through various predetermined level settings, the present invention significantly improves the suitability to the power source and the change of the loading. After altering the settings to these predetermined levels, the present invention even can adapt to various combinations of the power source and the loading, such as power banks and smart phones, uninterrupted power supplies and desktop computers.

Furthermore, those predetermined levels in the control module can be set with the implementation as programmable logic controller (PLC) or field programmable gate array (FPGA), and then control the switching module, the buck module and the boost module through the digital signal processor (DSP) or microprocessor control unit (MCU) within the control module.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAILED DESCRIPTION OF THE PREFERRED EMBODIMENTS

Figure 2:
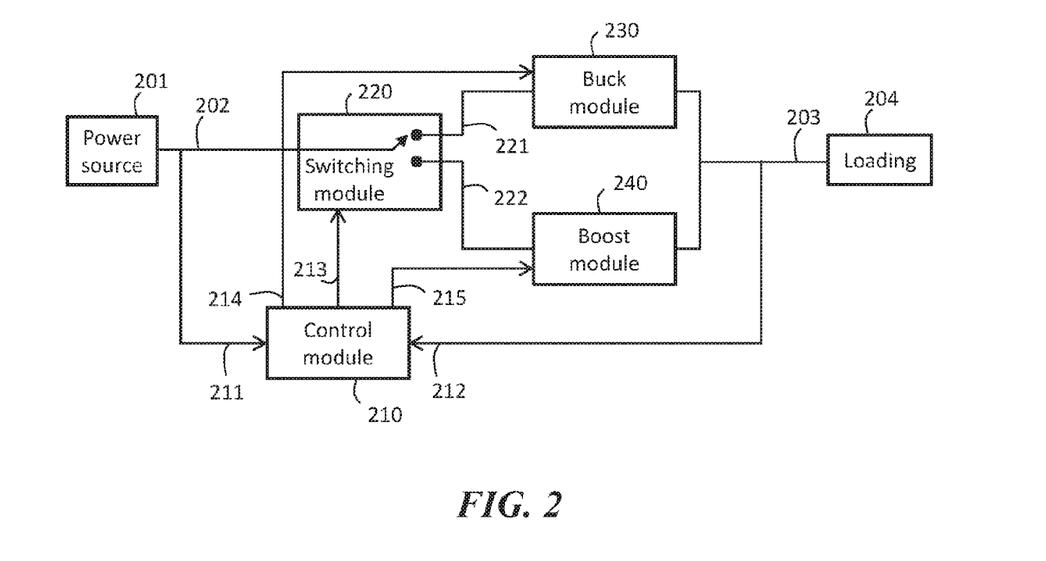
FIG. 2 is a circuit block diagram of one of the embodiments which demonstrates the major circuit blocks and how they operate.

The present invention provides a hybrid power convertor and one of its embodiments is shown as FIG. 2. First of all, the range of the output voltage of the hybrid power convertor can be set based on the properties of the loading 204. For example, if the hybrid power convertor has to have the maximum output voltage as 13.125V, the rated voltage as 12.5V and the minimum output voltage as 11.45V for the loading 204, it is more suitable to take 4 lithium-ion cells in series to be the power source 701 in this condition.

Figure 3:
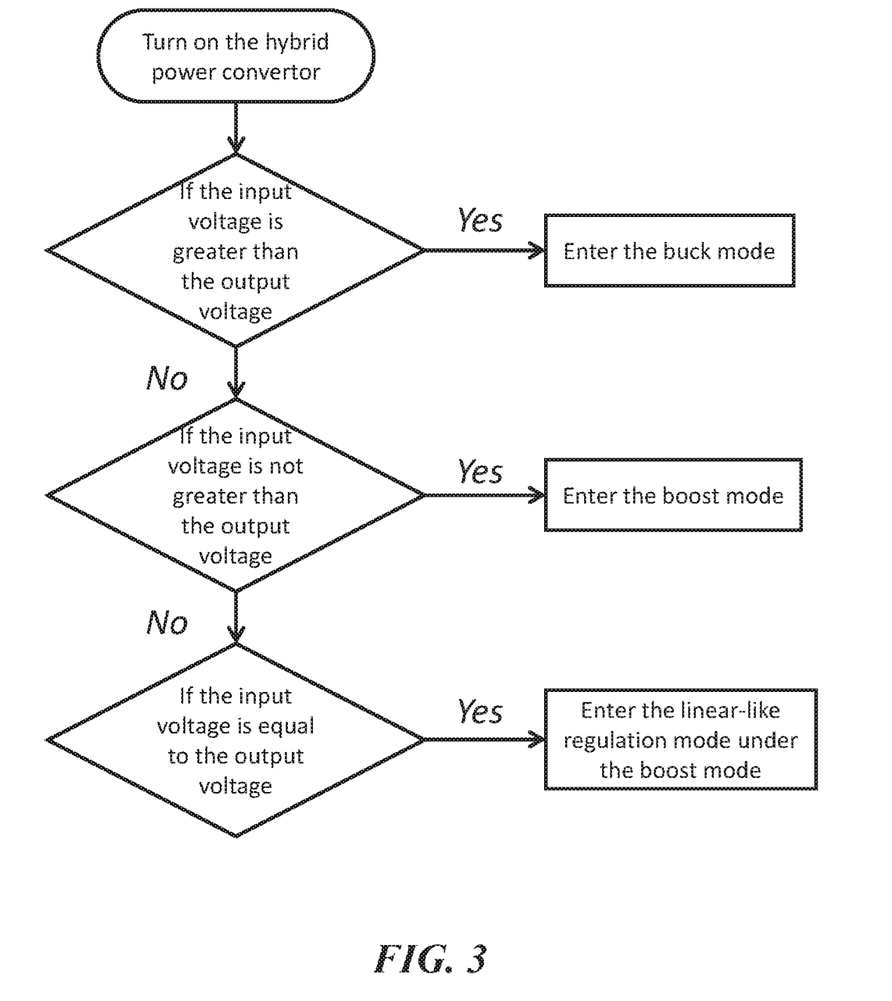
FIG. 3 is the flow chart of the initial voltage determining step which demonstrates the basis and flow of determination of one of the embodiments.

The first comparison terminal 211 of the control module 210 is coupled to the input terminal 202 of the hybrid power convertor and the second comparison terminal 212 is coupled to the output terminal 203 of the hybrid power convertor. The control module 210 performs an initial voltage determining step when it starts to work, and the detailed flow chart is shown as FIG. 3. The control module 210 compares the difference between the first comparison terminal 211 and the second comparison terminal 212. If the input voltage is greater than the output voltage, the control module 210 sends a buck trigger signal through the mode-control terminal 213 to the switching module 220 and the input terminal 202 is switched to the buck input terminal 221, and therefore the input terminal 202 is conducted to the buck module 230. If the input voltage is not greater than the output voltage, the control module 210 sends a boost trigger signal to the switching module 220 and the input terminal 202 is switched to the boost input terminal 222, and therefore the input terminal. 202 is conducted to the boost module 240.

Figure 4:
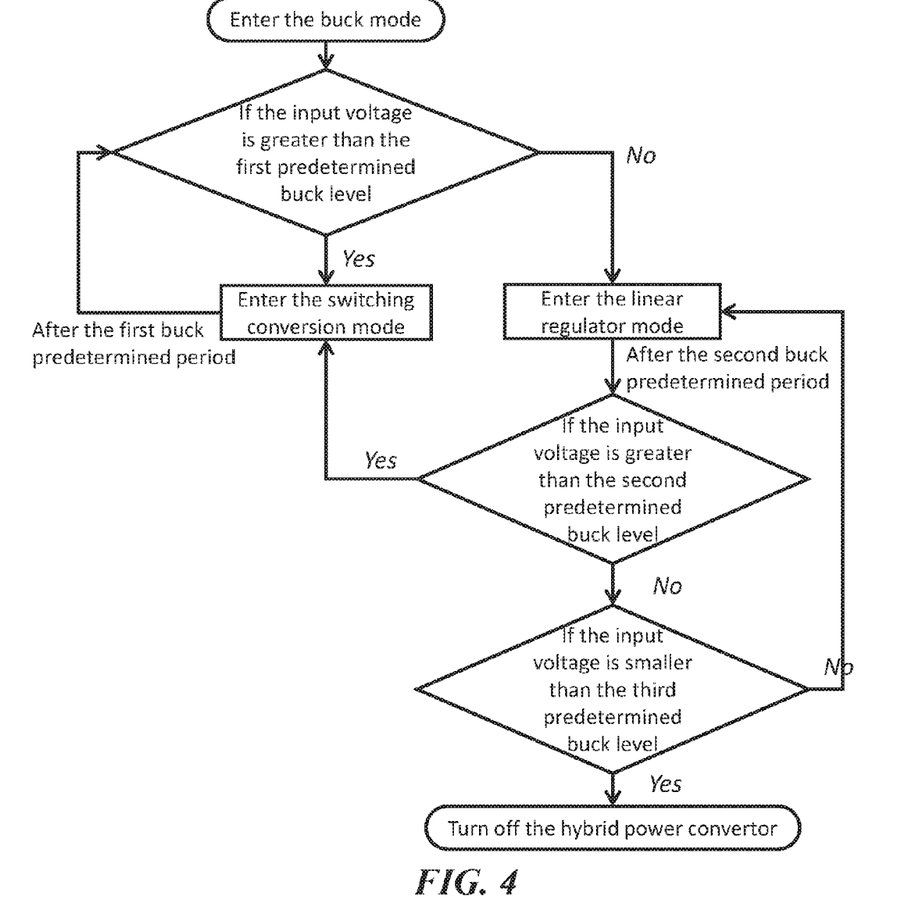
FIG. 4 is the determining step flow chart under buck mode which demonstrates the basis and flow of one of the embodiments under buck mode.

As shown in FIG. 4, when the input terminal 202 is conducted to the buck module 230, the hybrid power convertor operates under the buck mode. First, the control module 210 compares the first predetermined buck level and the input voltage obtained from the first comparison terminal 211. The first predetermined buck level is 1/0.95 times the rated voltage. If the rated voltage of the hybrid power convertor is 12.5V, the first predetermined buck level is 12.5V/0.95=13.15V. The output voltage of the saturated lithium-ion battery (the input voltage of the hybrid power convertor) is 16.8V, which is clearly much higher than the first predetermined buck level, and therefore the hybrid power convertor enters the switching conversion mode. The switching conversion mode is more efficient when the difference between the input voltage and the output voltage in the hybrid power convertor is bigger, but as the consumption of the electrical power in the lithium-ion battery, the output voltage of the lithium-ion battery will decrease, and therefore the input voltage of the hybrid power convertor will decrease, too. Thus, the difference between the input voltage and the output voltage in the hybrid power convertor is getting closer, and the switching conversion mode will lose the efficiency advantage. For that reason, the control module 210 has to compare the first predetermined buck level and the input voltage every first buck predetermined period.

When the electrical power is consumed gradually, the input voltage of the hybrid power convertor will not be greater than the first predetermined buck level, 13.15V. Because the input voltage of the hybrid power convertor approximates to the maximum output voltage, 13.125V it is more efficient to fine tune the input voltage of the hybrid power convertor to the output voltage of the hybrid power convertor by the linear regulation mode.

Under the linear regulation mode, the comparison between the input voltage of the hybrid power convertor and the second predetermined buck level will be performed by the control module 210 every second buck predetermined period. If the loading has any change that makes output voltage of the lithium-ion battery lift to be greater than the second predetermined buck level, the hybrid power convertor returns to the switching conversion mode. For the operation stability of whole the hybrid power convertor, the concept of the response lag in control is adopted, and therefore the second predetermined buck level is 1/0.9 times the rated voltage. In other words, it is 90% of the duty cycle of the switching conversion mode. In this embodiment, the second predetermined buck level is 12.5V/0.9, which approximates to 13.88V.

On the contrary, if the comparison result obtained by the control module 210 is that the input voltage of the hybrid power convertor is not greater than the second predetermined buck level and then the control module 210 proceeds the comparison between the input voltage of the hybrid power convertor and the third predetermined buck level. The third predetermined buck level can be 0.896 times the rated voltage and in this embodiment it is 12.5V×0.896, which approximates to 11.2V. In this condition, the lithium-ion battery is almost exhausted, and therefore the third predetermined buck level can also be set as the output voltage of the lithium-ion battery closed to exhaustion. In conclusion, if the input voltage of the hybrid power convertor is smaller the third predetermined buck level, the hybrid power convertor shuts down; if the input voltage of the hybrid power convertor is not smaller than the third predetermined buck level which means that the input voltage of the hybrid power convertor is between 13.88V and 11.2V (or the output voltage of the lithium-ion battery closed to exhaustion), the buck mode enters the linear regulation mode.

Figure 5:
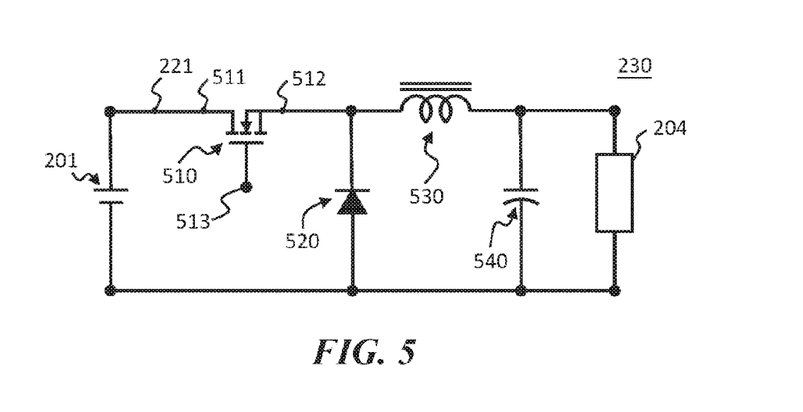
FIG. 5 shows the circuit diagram of the buck module which demonstrates one of the embodiments of the buck module circuit and how it works.

FIG. 5 demonstrates the essential elements of the buck module 230 in one of the embodiments and how it works. The buck transistor 510 include three terminals, in which the first buck transistor terminal 511 and the second buck transistor terminal 512 are parts of the circuitry of the buck module 230. As the buck module 230 during the switching conversion mode, the third buck transistor terminal 513 is controlled by the buck-control terminal 214 of the control module 210 to turn the buck transistor 510 on or off. The on/off of the buck transistor 510 directly effects on the input voltage of the hybrid power convertor, in which the concept is similar to the pulse width modulation. As the time being occupied by one on/off cycle is constant (the frequency is constant), changing the percentage of duty cycle (changing the time occupied by on state) makes the whole average voltage drop. In other words, the buck transistor 510 is flipping between the saturation mode and the cut-off mode as a switch. When the buck transistor 510 is on, the current goes through the inductance 530, stores the electrical energy in it and forms a complete loop through the loading 204. When the buck transistor 510 is of the inductance 530 generates continuous current which goes through the loading 204 and the buck diode 520 so as to forms a complete loop. The inductance 530 and the capacitor 540 can make the wave shape of the output smoother.

During the linear regulator mode, the third buck transistor terminal 513 is controlled by the buck-control terminal 214 of the control module 210 to operate in linear mode which is similar to a variable resistor to stabilize and control the output voltage of the hybrid power convertor. The advantage of the linear regulator mode is to avoid the limitation of the switching conversion mode that the duty cycle has to very approximate to 1 when the difference between input voltage and output voltage of the hybrid power convertor is small.

Figure 6:
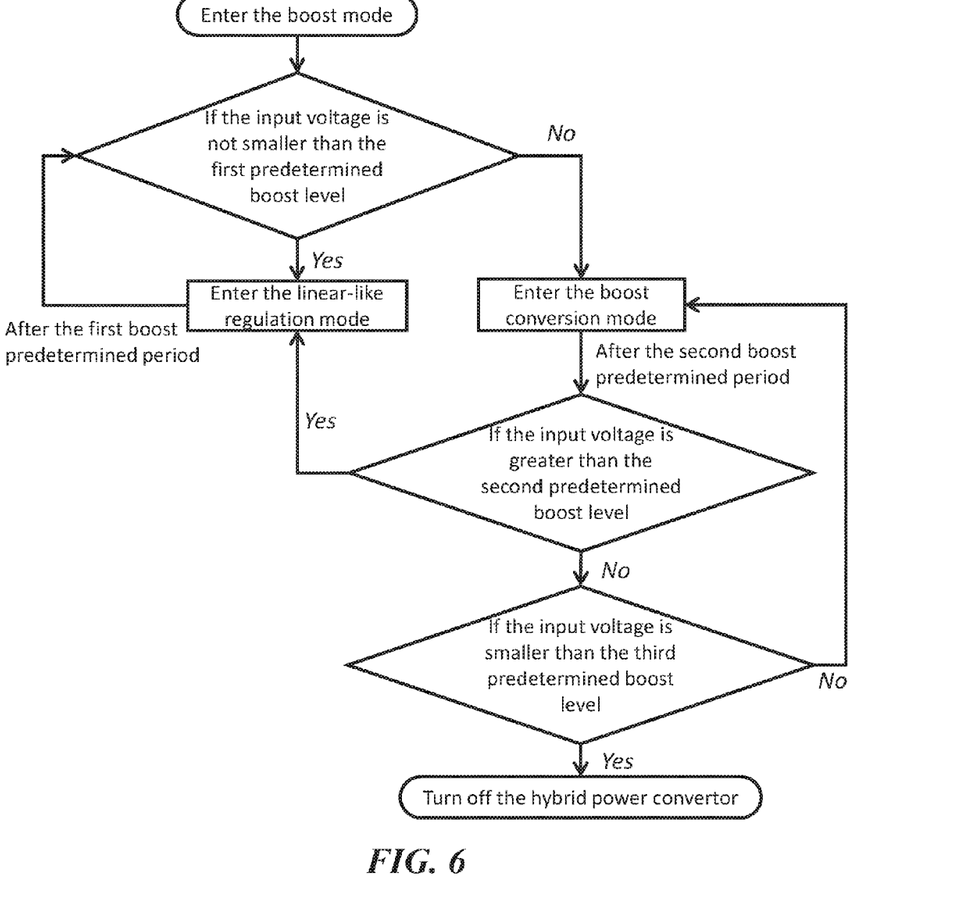
FIG. 6 is the determining step flow chart under boost mode which demonstrates the basis and flow of one of the embodiments under boost mode.

Referring to FIG. 6, the condition of the hybrid power convertor is the same, its maximum output voltage is 13.125V, its rated voltage is 12.5V and its minimum output voltage is 11.45V to the loading 204. Instead of the 4 lithium-ion cells battery, the following embodiment contains a 3 lithium-ion cells battery to demonstrate the steps after the input terminal 202 is switched to the boost module 240 and during the boost mode. For the lithium-ion battery, the maximum output voltage is 12.6V, the average output voltage is 11.2V and the minimum output voltage is 8.4V. For the hybrid power convertor, the maximum input voltage is 12.6V, the average input voltage is 11.2V and the minimum input voltage is 8.4V.

Once entering the boost mode, the control module compares the first boost predetermined level and the input voltage of the hybrid power convertor obtained from the first comparison terminal 211. The first predetermined boost level is 0.96 times the rated voltage. If the rated voltage of the hybrid power convertor is 12.5V, the first predetermined boost level is 12.5V×0.96, 12V. The output voltage of the lithium-ion battery when saturation is 12.6V which is not smaller than the first predetermined boost level, and therefore the hybrid power convertor enters the linear-like regulation mode. In this mode, the input voltage of the hybrid power convertor is outputted directly. However, with the consumption of the electrical power in the lithium-ion battery, the output voltage of the lithium-ion battery will decrease, and therefore the input voltage of the hybrid power convertor will decrease, too. The input voltage of the hybrid power convertor may be smaller than the first predetermined boost level, and therefore the comparison between the first predetermined boost level and the input voltage has to be performed every first boost predetermined period.

When the input voltage of the hybrid power convertor drops to be smaller than the first predetermined boost level which is 12V, it is lower than the rated voltage of the hybrid power convertor. Therefore, the hybrid power convertor enters the boost conversion mode.

Under the boost conversion mode, the condition of the loading may change which makes the input voltage of the hybrid power convertor lift. For that reason, the control module 210 has to compare the input voltage of the hybrid power convertor and the first predetermined boost level every second boost predetermined period. If the input voltage of the hybrid power convertor lifts to be greater than the rated voltage of the hybrid power convertor, the hybrid power convertor enters the linear-like regulation mode again and outputs the input voltage of the hybrid power convertor directly. Therefore, the rated voltage of the hybrid power convertor can be set as the second predetermined boost level.

On the contrary, if the comparison result obtained by the control module 210 is that the input voltage of the hybrid power convertor is not greater than the second predetermined boost level, the control module 210 performs the comparison between the input voltage of the hybrid power convertor and the third predetermined boost level. The third predetermined boost level can be 0.672 times the rated voltage and in this embodiment it is 12.5V×0.672, which approximates to 8.4V If the output voltage of the lithium-ion battery is smaller than 8.4V, the lithium-ion battery reaches its minimum output voltage (the output voltage of the hybrid power convertor). If the lithium-ion battery continues discharging, the lithium-ion battery will over discharge and the life time of the lithium-ion battery may be shortened. Based on the reason, the third predetermined boost level can also be set as the output voltage of the lithium-ion battery closed to exhaustion. In conclusion, if the input voltage of the hybrid power convertor is smaller than the third predetermined boost level, the hybrid power convertor shuts down; if the input voltage of the hybrid power convertor is not smaller than the third predetermined buck level which means that the input voltage of the hybrid power convertor is between 12.5V and 8.4V (or the output voltage of the lithium-ion battery closed to exhaustion), the hybrid power convertor enters the boost conversion mode.

Figure 7:
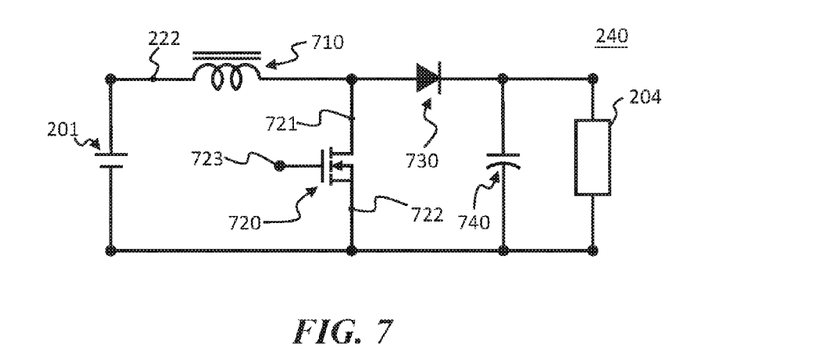
FIG. 7 shows the circuit diagram of the boost module which demonstrates one of the embodiments of the boost module circuit and how it works.

FIG. 7 demonstrates the essential elements of the boost module 240 in one of the embodiments and how it works. The boost transistor 720 includes three terminals, in which the first boost transistor terminal 721 and the second boost transistor terminal 722 are parts of the circuitry of the boost module 240. As the boost module 240 under the boost conversion mode, the third boost transistor terminal 723 is controlled by the boost-control terminal 215 of the control module 210 to turn the boost transistor 720 on or off.

In the course of boost, the boost inductance 710 is charged first of all, the boost transistor 720 is turned on, the input voltage passes through the boost inductance 710, and the boost diode 730 prevents the boost capacitor 740 from grounding. Because the input current is direct current, the current going through the boost inductance 710 increases in a certain ratio linearly, and the ration is related to the specification of the boost inductance 710. As the current going through the boost inductance 710 increases, some electrical energy is stored in the boost inductance 710.

When the boost transistor 720 turns off, the current going through the boost inductance 710 does not drop to zero immediately due to the self-inductance properly of the inductance, but decreases slowly from the current value when the inductance is charged to zero completely. Because the boost transistor 720 already turns off, the boost inductance 710 only can discharge through the circuit in the direction of the boost diode 730. Therefore, the boost capacitor 740 is charged by the boost inductance 710, and the voltage cross the boost capacitor 740 is getting higher. When the voltage cross the boost capacitor 740 is higher than the input voltage of the hybrid power convertor, and if the capacity of the boost capacitor 740 is big enough, the continue current at the output terminal can be kept. Due to the boost transistor 720 turning on and off repeatedly, the output voltage higher than the input voltage can be obtained cross over the boost capacitor 740.

As the boost module 240 under the linear-like regulation mode which allows the input voltage to be output directly. The third boost transistor terminal 723 is controlled by the boost-control terminal 215 of the control module 210 to keep the boost transistor 720 stay off. The output voltage of the power source 201 passes through the boost inductance 710 and the boost diode 730 to form the output voltage of the hybrid power convertor to the loading 204.

While the present invention has been described in connection with what is considered the most practical and preferred embodiment, it should be understood that this invention is not limited to the disclosed embodiment but is intended to cover various arrangements included within the spirit and scope of the broadest interpretation so as to encompass all such modifications and equivalent arrangements.

What is claimed is:

1. A method of controlling a hybrid power convertor, comprising:
    providing a voltage to make the hybrid power convertor generate an output voltage;
    determining a rated voltage based on the output voltage; and
    performing an initial voltage determining step, comprising:
        when the voltage is greater than the output voltage, entering a buck mode; and
        when the voltage is not greater than the output voltage, entering a boost mode,
        wherein the buck mode alternatively performs a switching conversion mode or a linear regulation mode, and the boost mode alternatively performs a linear-like regulation mode or a boost conversion mode.

2. The method as claimed in claim 1, wherein during the buck mode, performing a first buck determining step, comprising:

when the voltage is greater than a first predetermined buck level, entering the switching conversion mode; and when the voltage is not greater than the first predetermined buck level, entering the linear regulation mode, wherein the first predetermined buck level is 1/0.95 times the rated voltage.

3. The method as claimed in claim 2, further comprising:

under the switching conversion mode and after a first buck predetermined period, returning to the first buck determining step.

4. The method as claimed in claim 2, further comprising:

under the linear regulation mode and after a second buck predetermined period, performing a second buck determining step, comprising:

when the voltage is greater than a second predetermined buck level, entering the switching conversion mode, wherein the second predetermined buck level is 1/0.9 times the rated voltage.

5. The method as claimed in claim 4, wherein said second buck determining step further comprising:

when the voltage is not greater than the second predetermined buck level, performing a third buck determining step, comprising:

when the voltage is not less than a third predetermined buck level, returning to the linear regulation mode; and when the voltage is less than the third predetermined buck level, shutting down the hybrid power convertor, wherein the third predetermined buck level is 0.896 times the rated voltage.

6. The method as claimed in claim 1, wherein during the boost mode, performing a first boost determining step, comprising:

when the voltage is not less than a first predetermined boost level, entering the linear-like regulation mode; and when the voltage is less than the first predetermined boost level, entering the boost conversion mode, wherein the first predetermined boost level is 0.96 times the rated voltage.

7. The method as claimed in claim 6, further comprising:

under the linear-like regulation mode and after a first boost predetermined period, returning to the first boost determining step.

8. The method as claimed in claim 6, further comprising:

under the boost conversion mode and after a second boost predetermined period, performing a second boost determining step, comprising:

when the voltage is greater than a second predetermined boost level, entering the linear-like regulation mode, wherein the second predetermined boost level is the rated voltage.

9. The method as claimed in claim 8, wherein said second boost determining step further comprising:

when the voltage is not greater than the second predetermined boost level, performing a third boost determining step, comprising:

when the voltage is not less than a third predetermined boost level, entering to the boost conversion mode; and when the voltage is less than the third predetermined boost level, shutting down the hybrid power convertor, wherein the third predetermined boost level is 0.672 times the rated voltage.

10. The method as claimed in claim 6, wherein said first boost determining step further comprising:

when the voltage equals to the output voltage, entering the linear-like regulation mode.

11. A hybrid power convertor, comprising:

an input terminal receiving an input voltage;

an output terminal exporting an output voltage;

a control module having a first comparison terminal coupled to the input terminal, a second comparison terminal coupled to the output terminal, a mode-control terminal, a boost-control terminal and a buck-control terminal;

a switching module coupled to the input terminal and the mode-control terminal, and having a buck input terminal and a boost input terminal;

a buck module coupled to the buck input terminal, the buck-control terminal and the output terminal, and capable of performing a switching conversion mode or a linear regulation mode alternatively; and a boost module coupled to the boost input terminal, the boost-control terminal and the output terminal, and capable of performing a boost conversion mode or a linear-like regulation mode alternatively, wherein when the input voltage is greater than the output voltage, the control module makes the switching module conductive to the buck module; and when the input voltage is not greater than the output voltage, the control module makes the switching module conductive to the boost module.

12. The hybrid power convertor as claimed in claim 11, wherein said buck module further comprising:

a buck transistor having a first buck transistor terminal, a second buck transistor terminal and a third buck transistor terminal, wherein the first buck transistor terminal is coupled to the buck input terminal;

a buck inductor having a first buck inductor terminal and a second buck inductor terminal, wherein the first buck inductor terminal is coupled to the second buck transistor terminal, and the second buck inductor terminal is coupled to the output terminal;

a buck capacitor having a first capacitor terminal and a second capacitor terminal, wherein the first capacitor terminal is coupled to the second buck inductor terminal, and second capacitor terminal is grounded; and a buck conductive element at least having a first buck conductive element terminal and a second buck conductive element terminal, wherein the first buck conductive element terminal is coupled to the second buck transistor terminal, and the second buck conductive element terminal is grounded, wherein the third buck transistor terminal is coupled to the buck-control terminal, and the control module makes the buck module alternatively perform in one of the switching conversion mode and the linear regulation mode based on a predetermined buck level.

13. The hybrid power convertor as claimed in claim 12, wherein said buck transistor is a metal oxide semiconductor field effect transistor (MOSFET), the first buck transistor terminal is a drain of the MOSFET, the second buck transistor terminal is a source of the MOSFET, and the third buck transistor terminal is a gate of the MOSFET.

14. The hybrid power convertor as claimed in claim 12, wherein said buck transistor is a bipolar junction transistor (BJT), the first buck transistor terminal is a collector of the BJT, the second buck transistor terminal is an emitter of the BJT, and the third buck transistor terminal is a base of the BJT.

15. The hybrid power convertor as claimed in claim 12, wherein said buck conductive element is a diode, the first buck conductive element terminal is a cathode of the diode, and the second buck conductive element terminal is an anode of the diode.

16. The hybrid power convertor as claimed in claim 12, wherein said buck conductive element is a metal oxide semiconductor field effect transistor (MOSFET), the first buck conductive element terminal is a source of the MOSFET, the second buck conductive element terminal is a drain of the MOSFET, and a gate of the MOSFET is coupled to the control module.

17. The hybrid power convertor as claimed in claim 12, wherein when said control module detects that the input voltage is greater than the predetermined buck level, the control module controls the buck transistor so as to make the buck module enter the switching conversion mode.

18. The hybrid power convertor as claimed in claim 12, wherein when the control module detects that the input voltage is not greater than the predetermined buck level, the control module controls the buck transistor so as to make the buck module enter the linear regulation mode.

19. The hybrid power convertor as claimed in claim 11, wherein said boost module further comprising:

a boost inductor having a first boost inductor terminal and a second boost inductor terminal, wherein the first boost inductor terminal is coupled to the boost input terminal;

a boost transistor having a first boost transistor terminal, a second boost transistor terminal and a third boost transistor terminal, wherein the first buck transistor terminal is coupled to the second boost inductor terminal and the second boost inductor is grounded;

a boost diode at least having an anode and a cathode, wherein the anode is coupled to the second boost inductor terminal, and the cathode is coupled to the output terminal; and a boost capacitor having a first boost capacitor terminal and a second boost capacitor terminal, wherein the first boost capacitor terminal is coupled to the cathode and the second boost capacitor is grounded, wherein the third boost transistor terminal is coupled to the boost-control terminal, and the control module makes the boost module alternatively perform in one of the boost conversion mode and the linear-like regulation mode based on a predetermined boost level.

20. The hybrid power convertor as claimed in claim 19, wherein said boost transistor is a metal oxide semiconductor field effect transistor (MOSFET), the first boost transistor terminal is a drain of the MOSFET, the second boost transistor terminal is a source of the MOSFET, and the third boost transistor terminal is a gate of the MOSFET.

21. The hybrid power convertor as claimed in claim 19, wherein said buck transistor is a bipolar junction transistor (BJT), the first boost transistor terminal is a collector of the BJT, the second boost transistor terminal is an emitter of the BJT, and the third boost transistor terminal is a base of the BJT.

22. The hybrid power convertor as claimed in claim 19, wherein when said control module detects that the input voltage is not less than the predetermined boost level, the control module controls the boost transistor so as to make the boost module enter the linear-like regulation mode.

23. The hybrid power convertor as claimed in claim 19, wherein when the control module detects that the input voltage is less than the predetermined boost level, the control module controls the boost transistor so as to make the boost module enter the boost conversion mode.

* * * * *